United States Patent [19]
Oritz, Jr. et al.

[11] Patent Number: 5,673,343
[45] Date of Patent: Sep. 30, 1997

[54] INJECTION CHAMBER FOR HIGH POWER OPTICAL FIBER TRANSMISSION

[75] Inventors: Angel Luis Oritz, Jr., Saratoga Springs; Sandra Freedman Feldman, Schenectady; Philip Randall Staver, Hagaman, all of N.Y.

[73] Assignee: General Electric Company, Schenectady, N.Y.

[21] Appl. No.: 703,278

[22] Filed: Aug. 26, 1996

Related U.S. Application Data

[62] Division of Ser. No. 544,509, Oct. 18, 1995, Pat. No. 5,537,335.

[51] Int. Cl.$^6$ .................................................. G02B 6/26
[52] U.S. Cl. .................................. 385/31; 372/6; 385/90
[58] Field of Search ........................ 385/31, 38, 128, 385/123, 70, 5, 34, 89, 119, 121, 125, 147, 127, 90; 359/227, 228, 230, 177, 62.5, 619, 628, 641; 372/6, 70, 71, 433; 356/153, 400, 73.1; 250/201.4, 205, 227.11; 219/121.6, 121.63, 121.64, 121.67, 121.69, 121.7, 121.85, 121.68

[56] References Cited

U.S. PATENT DOCUMENTS

| 4,564,736 | 1/1986 | Jones et al. | 219/121.6 |
|---|---|---|---|
| 4,676,586 | 6/1987 | Jones et al. | 385/33 |
| 4,678,273 | 7/1987 | Vilhelmsson | 385/123 |
| 4,681,396 | 7/1987 | Jones | 385/33 |
| 4,812,641 | 3/1989 | Ortiz, Jr. | 250/227.11 |
| 4,840,450 | 6/1989 | Jones et al. | 385/90 |
| 4,984,885 | 1/1991 | Ortiz, Jr. | 386/38 |
| 5,187,760 | 2/1993 | Hubber | 385/37 |
| 5,245,682 | 9/1993 | Ortiz, Jr. | 385/33 |
| 5,268,978 | 12/1993 | Hong et al. | 385/33 |
| 5,418,880 | 5/1995 | Lewis et al. | 385/123 |
| 5,592,333 | 1/1997 | Lewis | 359/628 |

*Primary Examiner*—Akm E. Ullah
*Attorney, Agent, or Firm*—Patrick K. Patnode; Donald S. Ingraham

[57] ABSTRACT

The instant invention is directed in general to optical systems in which a laser beam is injected into the end of an optical fiber and, more specifically, to laser materials processing systems in which a high power laser beam is injected into the fiber input end for transmission to a remote end of the fiber where materials processing is performed with the emitted beam. In a preferred embodiment of the instant invention, an injection chamber is used to isolate the optical fiber injection end from the surrounding air by enclosing the optical fiber injection end, and providing a gas purge to reduce the air concentration and to keep dust from entering or settling on the optical fiber injection end. This preferred embodiment prevents the ionization of the air surrounding the fiber injection end, thereby preventing the damaging effects of ionization which often occur during optical fiber injection processes.

13 Claims, 2 Drawing Sheets

INJECTION CHAMBER FOR HIGH POWER OPTICAL FIBER TRANSMISSION

This application is a division of application Ser. No. 08,544,509, filed Oct. 18, 1995, now U.S. Pat. No. 5,537,335.

The following invention was made with government support under contract number MDA 972-94-30020 which was awarded by the Defense Advanced Research Projects Agency (DARPA). The government has certain rights in this invention.

BACKGROUND OF THE INVENTION

The instant invention is directed in general to optical systems in which a laser beam is injected into the end of an optical fiber and, more specifically, to laser based material processing systems in which a high power laser beam is injected into the fiber input end for transmission to a remote end of the fiber where materials processing is performed with the emitted beam.

Laser based materials processing as known in the art and as used herein, refers to performance of processes such as cutting, welding, drilling and soldering, using a continuous wave or pulsed laser beam. The average power of such a laser beam may range from as little as approximately one watt to thousands of watts, the specific power being selected on the basis of the particular processing being performed. It is known in the art to transmit the laser beam from the laser to the vicinity of the workpiece by means of an optical fiber. Apparatus and methods for injecting a laser beam into an optical fiber for transmission there through are disclosed in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System", the disclosures of these patents being incorporated in their entirety herein by reference.

A problem associated with high power optical fiber injection techniques is that high power lasers tend to ionize the air at the focal point of the focusing lens used to inject the laser into the optical fiber end. This occurs due to the extremely high energy densities present. Ionization of this type causes several problems with injection techniques.

First, ionization of the air in front of the optical fiber causes damage during injection because it causes debris to deposit on the optical fiber face. This debris in the air (usually dust) is a catalyst for breakdown because the debris is absorbing at many laser wavelengths. When the debris in the air is deposited on the optical fiber face, due to the ionization, the debris makes the fiber face absorbing to the wavelength being used, causing fiber damage.

Second, ionization of the air generates a hot plasma. When the air closest to the fiber injection face is ionized and the ionization generates this hot plasma, the fiber tip will melt. This condition results in burning of the fiber injection end and failure in the injection process.

Upon the occurrence of each need to replace a damaged optical fiber, the time required to effect fiber injection represents manufacturing downtime and therefore manufacturing cost and inefficiency. Furthermore, additional costs may be necessary in order to repair or replace any damaged optical fibers. Therefore, fiber injection must be completed without the high power beam damaging the optical fiber.

Therefore, it is apparent from the above that there exists a need in the art for an apparatus and method for high power laser fiber beam injection which prevents ionization of the air surrounding the optical fiber injection face or around the optical fiber entirely. It is a purpose of this invention, to fulfill this and other needs in the art in a manner more apparent to the skilled artisan once given the following disclosure.

SUMMARY OF THE INVENTION

The above-mentioned needs are met by the instant invention which relates to a novel apparatus and method for preventing ionization about an optical fiber during injection. More particularly, said apparatus and method use a novel injection chamber purged with a gas having a high breakdown threshold to prevent said ionization. Additionally, this gas should be clean and pure such that its breakdown threshold is undiminished.

Briefly, the instant invention is directed in general to optical systems in which a laser beam is injected into the end of an optical fiber and, more specifically, to laser materials processing systems in which a high power laser beam is injected into the fiber input end for transmission to a remote end of the fiber where materials processing is performed with the emitted beam.

In a preferred embodiment of the instant invention, an injection chamber is used to isolate the optical fiber injection end from the surrounding air by enclosing said optical fiber injection end, and providing a gas purge to reduce the air concentration and to keep dust from entering or settling on the optical fiber injection end. This preferred embodiment prevents the ionization of the air surrounding the fiber injection end, thereby preventing the damaging effects of ionization which often occur during optical fiber injection processes.

The preferred apparatus for an injection chamber for high power optical fiber transmissions, offers the following advantages: improved safety; ease of use; clean and dry environment; and decreased possibility of ionization. In fact, in many of the preferred embodiments, these factors of clean and dry environment and decreased possibility of ionization, are optimized to an extent considerably higher than heretofore achieved in prior, known apparatuses for an injection chamber for high power optical fiber transmissions.

Other objects and advantages of the present invention will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
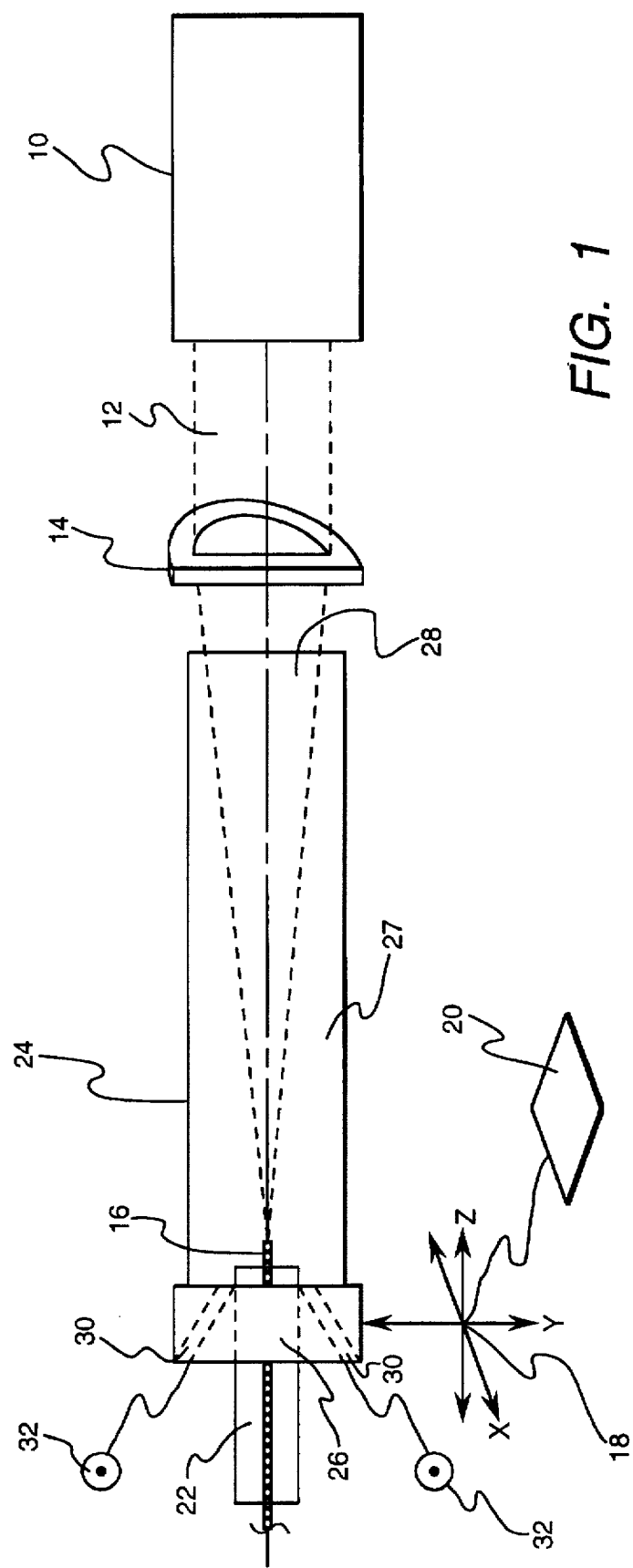
FIG. 1 is a perspective view of a laser to fiber injection system in accordance with the instant invention.

Referring first to FIG. 1 of the drawings, a first embodiment of an injection chamber within a laser to fiber injection system is shown.

The laser to fiber injection system includes a laser source 10, often a high power laser source, for generating and emitting a laser beam 12. Laser source 10 may be a solid state neodymium yttrium aluminum garnet (Nd:YAG) laser source, or any laser source which operates in a pulse mode or continuous wave mode and emits a beam having a wavelength in the near infrared or visible spectrum or any other wavelength which may be transmitted through an optical fiber. Other suitable solid state laser sources include, for example: Nd:glass; Nd:GGG (Gadolinium Gallium Garnet): Nd:GSGG (Gadolinium Scandium Gallium Garnet); a ruby laser; or an alexandrite laser. The present invention is not limited to practice with any one particular laser source.

Laser beam 12 is intercepted by a focusing means 14. Focusing means 14 is represented as a single planoconvex lens for focusing a laser beam for subsequent injection into an optical fiber 16.

Optical fiber 16 is positioned using a multi-axis positioner 18. Multi-axis positioner 18 may be manually controlled or controlled by a multi-axis stage controller 20. Often multi-axis positioner 18 comprises part of an optical fiber holder 22. Optical fiber holder 22, including multi-axis positioner 18 may be one such as the holder described in commonly assigned U.S. Pat. No. 4,840,450, entitled "Apparatus and Method for Optical Fiber End Positioning for Laser Injection," which is incorporated herein, in its entirety by reference. Multi-as positioner 18 includes the three degrees of freedom shown, and may also include a tilt control to adjust fiber pitch and yaw.

An injection chamber 24, surrounds optical fiber 16 and isolates optical fiber 16 from the surrounding air. The injection chamber 24 comprises: a sealing end 26, which provides a receiving area for fiber holder 22 and optical fiber 16 to be inserted, such that an air tight seal is formed between the sealing end and the fiber holder 22; an elongated hollow body 27; and an entrance aperture 28, allowing laser beam 12 to pass through injection chamber 24 and to enter optical fiber 16. In preferred embodiments, injection chamber 24 is cylindrical or rectangular in shape.

Injection chamber 24 may be made of stainless steel, aluminum, glass, plexi-glass or any other material with similar characteristics. Injection chamber 24 further comprises one or more gas ports 30 which fluidly connect elongated hollow body 27 of injection chamber 24 with a gas source(s) 32. Gas source(s) 32 provides a clean and pure gas having a high breakdown threshold. Because it is important to maintain nearly laminar flow through injection chamber 24, in a preferred embodiment, gas port(s) 30 should be positioned at the sealing end 26 of said injection chamber 24. This preferred embodiment allows the gas to flow from the sealing end 26 of injection chamber 24, across the optical fiber 16 and out of the entrance aperture 28. This flow pattern prevents turbulent flow about the optical fiber 16 and eliminates "dead zones" which provide areas for dust accumulation.

Gas source(s) 32 pumps a clean and pure gas having a high breakdown threshold, such as xenon, helium, nitrogen, or neon, into injection chamber 24. The injected gas reduces the air concentration inside of injection chamber 24, thus decreasing the possibility of ionization, by providing a slight positive pressure around optical fiber 16 to keep dust out of the injection chamber and off of optical fiber 16.

Figure 2:
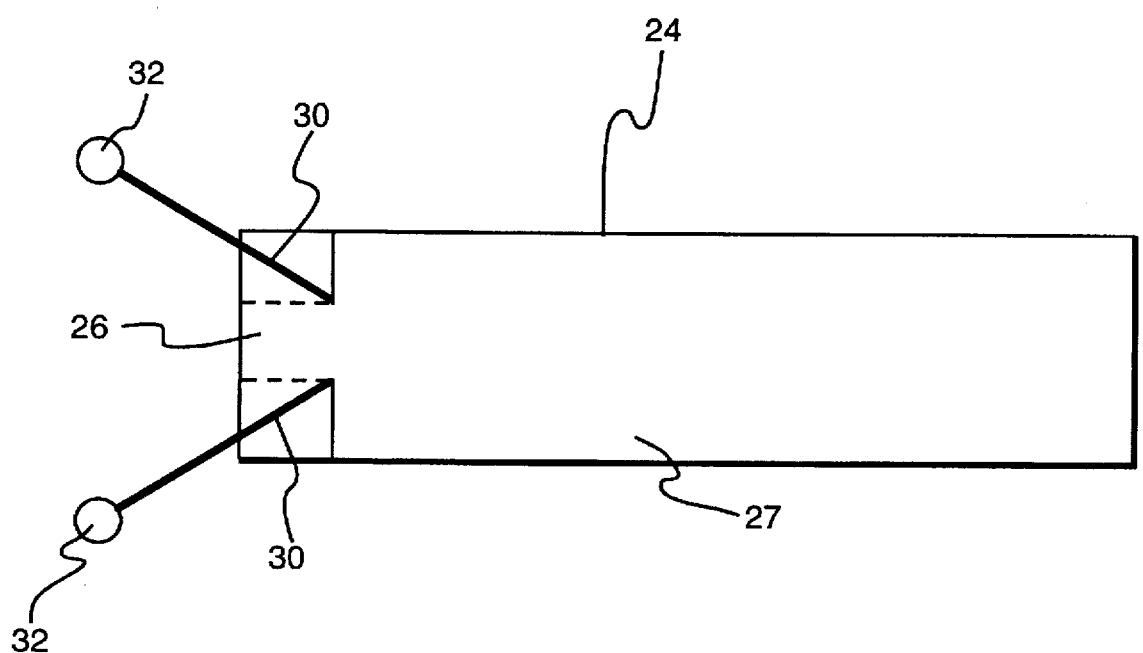
FIG. 2 is a perspective view of an injection chamber in accordance with the instant invention.

FIG. 1 depicts a laser injection system in which injection chamber 24 has been properly fitted with the fiber holder, creating the air tight seal, and FIG. 2 depicts injection chamber 24 prior to being placed within the laser injection system.

In operation, optical fiber 16 is positioned using multi-axis positioner 18 such that is optical fiber 16 is aligned with laser source 10 and is prepared for injection. Such alignment techniques are numerous, and well known in the art. Fiber holder 22 is then fitted with injection chamber 24 such that sealing end 26 forms an air tight seal with fiber holder 22. Importantly, entrance aperture 28 of injection chamber 24 must be positioned such that emitted laser beam 12 from laser source 10 would pass through entrance aperture 28 and direct upon optical fiber 16.

After fitting and prior to injection, a clean and pure gas having a high breakdown threshold, supplied from gas source(s) 32, is pumped into injection chamber 24 through gas port(s) 30. The gas reduces the air concentration inside of injection chamber 24 and after a predetermined purge time, the injection process may begin.

The foregoing has described several embodiments of an injection chamber for high power optical fiber transmission. While specific embodiments of the present invention have been described, it will be apparent to those skilled in the art that various modifications thereto can be made without departing from the spirit and scope of the invention as defined in the appended claims.

We claim:

1. An injection chamber for high power optical fiber transmission, comprising:

a sealing end for receiving a fiber holder and optical fiber, forming an air tight seal there between;

an entrance aperture for allowing an emitted laser beam to pass into said injection chamber;

an elongated hollow body fluidly connecting said sealing end and said entrance aperture; and one or more gas ports which fluidly connect one or more gas sources to said injection chamber.

2. An injection chamber for high power optical fiber transmission, according to claim 1, wherein said injection chamber is made of stainless steel.

3. An injection chamber for high power optical fiber transmission, according to claim 1, wherein said injection chamber is made of aluminum.

4. An injection chamber for high power optical fiber transmission, according to claim 1, wherein said injection chamber is made of glass.

5. An injection chamber for high power optical fiber transmission, according to claim 1, wherein said injection chamber is made of plexi-glass.

6. An injection chamber for high power optical fiber transmission, according to claim 1, wherein said injection chamber is cylindrical in shape.

7. An injection chamber for high power optical fiber transmission, according to claim 1, wherein said injection chamber is rectangular in shape.

8. An injection chamber for high power optical fiber transmission, according to claim 1, wherein said gas port(s) are positioned at the sealing end of said injection chamber.

9. An injection chamber for high power optical fiber transmission, according to claim 1, wherein said gas source(s) provides a clean and pure gas having a high breakdown threshold.

10. An injection chamber for high power optical fiber transmission, according to claim 1, wherein said gas source(s) provides helium.

11. An injection chamber for high power optical fiber transmission, according to claim 1, wherein said gas source(s) provides nitrogen.

12. An injection chamber for high power optical fiber transmission, according to claim 1, wherein said gas source(s) provides xenon.

13. An injection chamber for high power optical fiber transmission, according to claim 1, wherein said gas source(s) provides neon.

* * * * *

UNITED STATES PATENT AND TRADEMARK OFFICE
CERTIFICATE OF CORRECTION

PATENT NO. : 5,673,343

DATED : September 30, 1997

INVENTOR(S) : Angel L. Ortiz, Jr. et al.

It is certified that error appears in the above-identified patent and that said Letters Patent is hereby corrected as shown below:

On the title page:

In the "Related U.S. Application Data" please change "[62] Division of Ser. No. 544,509, Oct. 18, 1995, Pat. No. 5,537,335" to read --[62] Division of Ser. No. 544,509, Oct. 18, 1995, Pat. No. 5,636,302--.

Signed and Sealed this

Third Day of February, 1998

Attest:

BRUCE LEHMAN

Attesting Officer

Commissioner of Patents and Trademarks